(12) United States Patent
Oh

(10) Patent No.: US 8,317,630 B1
(45) Date of Patent: Nov. 27, 2012

(54) PLUNGING TYPE CONSTANT VELOCITY JOINT

(75) Inventor: Seung Tark Oh, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 13/176,821

(22) Filed: Jul. 6, 2011

(51) Int. Cl.
*F16D 3/223* (2011.01)

(52) U.S. Cl. .......................... 464/146; 464/906

(58) Field of Classification Search .............. 464/15, 464/139–146, 906
See application file for complete search history.

(56) References Cited

U.S. PATENT DOCUMENTS

| | | |
|---|---|---|
| 3,789,626 A | 2/1974 | Girguis |
| 4,533,339 A | 8/1985 | Girguis |
| 4,878,882 A | 11/1989 | Welschof et al. |
| 5,106,343 A | 4/1992 | Sakaguchi et al. |
| 5,853,328 A | 12/1998 | Kobayashi et al. |
| 5,947,826 A | 9/1999 | Seguin |
| 6,132,316 A | 10/2000 | Statham |
| 6,229,543 B1 | 5/2001 | Yamada et al. |
| 6,280,337 B1 | 8/2001 | Wormsbacher et al. |
| 6,299,543 B1 * | 10/2001 | Sone et al. ............. 464/146 |
| 6,299,544 B1 | 10/2001 | Schwarzler et al. |
| 6,616,538 B2 | 9/2003 | Perrow |
| 7,431,653 B2 | 10/2008 | Mochinaga et al. |
| 7,666,102 B2 * | 2/2010 | Feichter ............. 464/146 |
| 7,862,439 B2 * | 1/2011 | Une et al. ............. 464/146 |
| 8,079,914 B2 * | 12/2011 | Une et al. ............. 464/146 |

FOREIGN PATENT DOCUMENTS

| | | |
|---|---|---|
| DE | 3739868 A1 | 6/1989 |
| DE | 102005063006 | 4/2007 |
| JP | 53057341(A) | 5/1978 |
| JP | 3255226 (A) | 11/1991 |
| JP | 11182570(A) | 7/1999 |
| JP | 11182571 * | 7/1999 |
| JP | 11182571(A) | 7/1999 |
| JP | 2003176833(A) | 6/2003 |

* cited by examiner

*Primary Examiner* — Gregory Binda
*Assistant Examiner* — Josh Skroupa
(74) *Attorney, Agent, or Firm* — Marshall & Melhorn LLC (57) ABSTRACT

A constant velocity joint has an outer joint part, an inner joint part, a ball cage and a plurality of balls located in the cage. The outer surface of the inner joint part is provided with two radii and the inner surface of the ball cage is provided with two radii resulting in a joint that is more compact, more durable and lubricated better than known joints.

16 Claims, 7 Drawing Sheets

PLUNGING TYPE CONSTANT VELOCITY JOINT

FIELD OF INVENTION

The present invention relates to a vehicle joint, such as a plunging type constant velocity joint.

BACKGROUND OF THE INVENTION

Figure 1A:
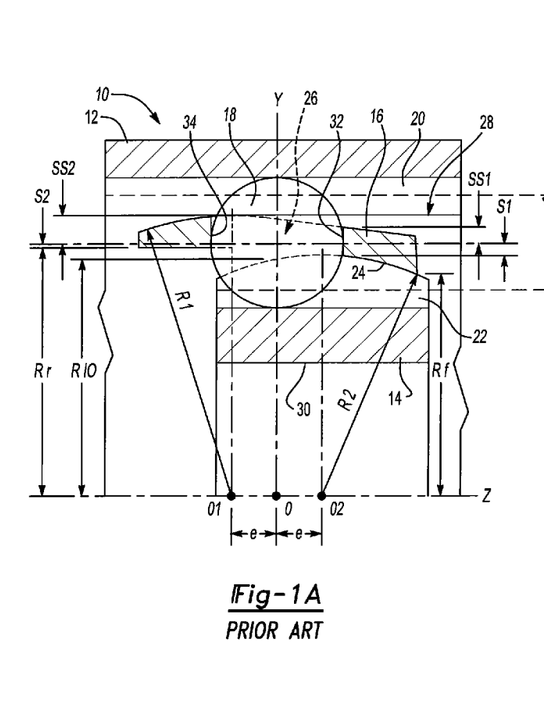
FIG. 1A is an enlarged side sectional view of a portion of a conventional joint.
Figure 1B:
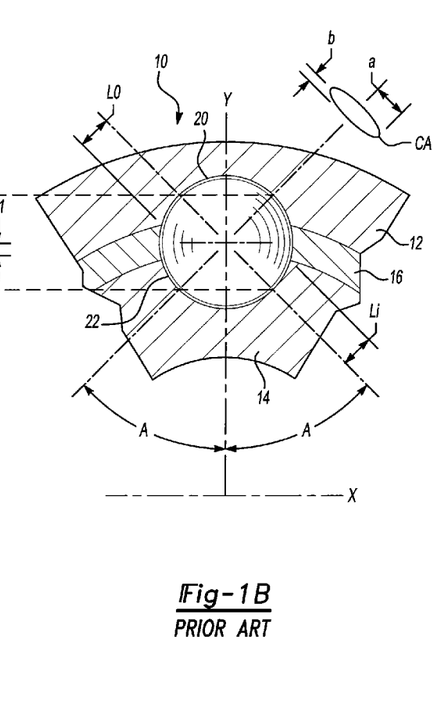
FIG. 1B is an enlarged cross sectional view of the joint in FIG. 1A.

As shown in FIGS. 1A and 1B, a conventional double offset joint 10 comprises an outer joint part 12, an inner joint part 14, a cage 16 and at least one ball 18. Typically, a plurality of balls 18 are provided. The outer joint part 10 has a cylindrical shape formed with a plurality of circumferentially spaced linear guide tracks 20 having a gothic arc or an elliptical form. The inner joint part 14 has circumferentially spaced linear guide tracks 22 formed on an outer spherical surface 24. The cage 16 retains the plurality of balls 18 in a plurality of pockets 26 circumferentially spaced about the cage 16. The cage 16 has an inner concave spherical surface at R2 and an outer convex spherical surface at R1. R1 and R2 are offset by e to the opposite sides of point O to points O1, O2 in the axial direction from the center of the ball pocket in which the outer convex spherical surface at R1 contacts a cylindrical bore 28 of the outer joint part 12. The inner concave spherical surface of the cage 16 at R2 contacts the outer convex spherical surface 24 of inner joint part 14. The inner joint part 14 also has an inner surface 30 for connection with a shaft (not shown).

In such a joint construction, if a certain torque is applied to the joint 10, a load acts on ball track 20, 22 or balls 18 in the direction normal to the ball track 20, 22. Another load derived partly from the load on the ball track 20, 22 acts on surfaces 32, 34 of the ball pockets 26 of the cage in axial direction Z, at an articulation angle. In this condition, the balls 18 contacts a track 20, 22 at the pressure angle A. A contact area CA is generated, taking the form of an ellipse defined by the longer length of elliptical contact a between the convex ball 18 and the concave track 22 and the shorter length of elliptical contact b made between the convex ball and the cylindrical formed track 20. However, a becomes equal to b on the surfaces 32, 33 of ball pocket 26, so the contact area takes a form of a circle, because a ball contacts a flat surface. The longer length of elliptical contact a on the ball track (hereafter contact ellipse length on ball track) and contact length on ball pocket (hereafter the contact length on the ball pocket) are design parameters to determine the cylindrical bore diameter of the outer joint part 12 in contact with outer spherical surface R1 of the cage 16 and the outer sphere diameter R2 of the inner joint part 14 in contact with the inner sphere diameter R2 of the cage 16. From this perspective, it is desirable that they (the cylindrical bore diameter of the outer joint part 12 and the outer sphere diameter of the inner joint part 14) be determined for the contact ellipse length a and not be cut off. If the contact ellipse length on the ball track or the ball pocket is cut off, contact stress on the ball track and the ball pocket increases by the amount of the cut off and affects durability of the joint 10.

Figure 1C:
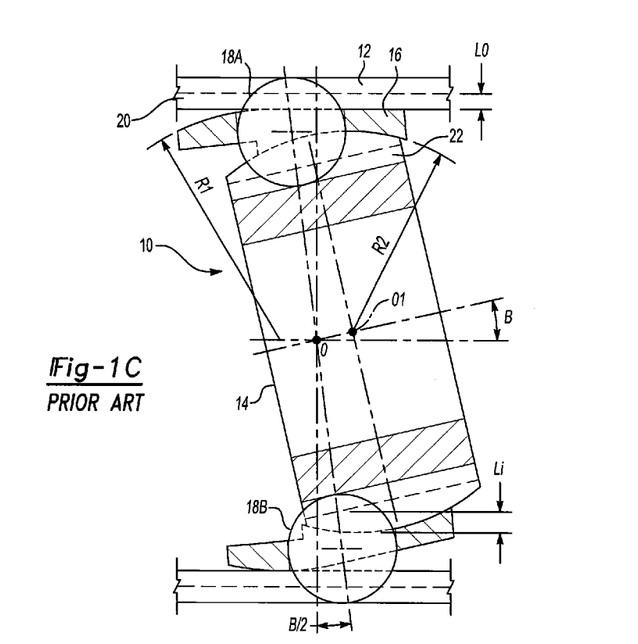
FIG. 1C is a view showing the operation of the joint in FIGS. 1A-1B.

In the event that a joint 10 rotates at an articulation angle B, best seen in FIG. 1C, a ball 18 reciprocates on the track 22 of the inner joint part 14 and the track 20 of the outer joint part 12. During the reciprocation of the ball 18, the distance between the pressure angle point and the bore diameter of outer joint part Lo does not vary along the ball track, due to its cylindrical shape, while that of the inner joint part Li varies along the ball track, due to its spherical shape defined by R2. More specifically, as the articulation angle increases, a ball 18 gets closer to the ends of the thickness of the inner joint part 14 on the ball track 22 and decreases the distance between the pressure angle point and the sphere diameter of the inner joint part Li, indicating that inner joint part 14 is inferior to the outer joint part 12 in terms of durability associated with the margin of contact in ellipse length a on the ball track. Furthermore, since the center of the outer sphere surface R2 is offset to a side O2 from the center O of the ball pocket at zero articulation angle, its diameter at the center of the ball pocket becomes RIO, as shown in FIG. 1A, so the inner joint part 12 is even inferior to the outer joint part 10 in terms of Li by difference of R2–RIO even at zero articulation angle.

At the same time, when a ball 18 reciprocates on the track, as shown in FIG. 1C, the ball 18 also moves in the radial direction and the circumferential direction on the surface of ball pocket 26. During the movement, one ball 18A moves closer to the edge of the outer spherical surface R1, while another ball 18B gets closer to the edge of the inner spherical surface R2 simultaneously in the radial direction, but it depends on the phase of the ball. In the worst case that either R1 or R2 is selected inadequately, a ball 18 could be derailed from the pocket 26. To prevent a ball 18 from being derailed from the pocket 26, the distance between the ball contact point and the inner spherical diameter (hereafter called cage inner spherical margin) S1 should be secured properly, as seen in FIG. 1A. Although a ball is not derailed from the ball pocket 26, contact stress on the surface of the ball pocket will increase by the contact length cut off, in case that S1 is smaller than the contact length a or b on the surface of the ball pocket 26. On the other hand, the rear opening diameter Rr should be greater than the outer spherical surface 22 diameter of the inner joint part 14 to get the inner joint part 14 assembled into the cage 16. It tends to make the distance between the rear opening diameter and the ball contact point on the ball pocket (hereafter called cage rear opening margin) S2 smaller than S1. Any attempt to increase the contact ellipse length a on the ball track 22 of the inner joint part 14 or on the ball track 20 of the outer joint part 12 without adjusting the other design parameters eventually causes the cage inner spherical margin S1, the cage rear opening margin S2 or the cage outer spherical margin SS1, SS2 to get smaller. Therefore, the contact ellipse length on ball track a and the contact length on the ball pocket a or b or the cage inner spherical margin S1, the cage outer spherical margin SS1, SS2, the cage rear opening margin S2 should be simultaneously considered for determining a bore diameter, outer spherical diameter, and inner spherical diameter, especially in terms of a compact design.

Recently, a lot of effort associated with compact design has been made to reduce the outside diameter of the outer joint part by increasing the number of balls, reducing the ball size, reducing the pitch circle diameter, and adjusting other design parameters, such as pressure angle and conformity ratio(=ball track radius/ball size). However, simple dimensional adjustments of design parameters in the conventional construction of double offset joint are not enough to achieve the compact design, due to the design constraints stated above, meaning that either the margin of the contact length on the ball pocket or the margin of contact of the ellipse length on the ball track is meant to be sacrificed to achieve the compact design, causing a reduction in either durability of the ball track or the durability of the cage ball pocket.

SUMMARY OF THE INVENTION

A plunging type constant velocity joint with a compact design and increased durability is provided by two partial spherical surfaces with different radii formed on the inner spherical surface of the cage and two partial spherical surfaces with different radii formed on the outer surface of inner joint part.

The plunging joint comprises an outer joint part having a cylindrical inner surface formed with a plurality of circumferentially spaced linear guide tracks, an inner joint part having an outer surface formed with the linear guide tracks matching those of the outer joint part, a plurality of torque-transmitting balls disposed within the ball tracks, and a cage retaining the balls in a plurality of pockets circumferentially spaced.

The claimed device is advantagous over the prior art for several reasons. Firstly, a partial spherical surface with a larger spherical radius formed on the outer surface of the inner joint part toward the rear opening of the cage provides more margin of contact ellipse length on the ball track, resulting in increased joint durability and a reduced joint size by the increment in the margin on the ball track. Secondly, a partial spherical surface with a smaller spherical radius formed on the inner surface of the cage toward the front opening of the cage provides more margin of contact length on the surface of ball pocket, resulting in increased joint durability and a reduced joint size by the increment in the margin on the ball pocket. Thirdly, an open space formed between the two different spherical surfaces with their different radii provides a better lubrication mechanism as the open space gets wider at a phase angle of zero degrees and gets narrower at a phase angle of 180 degrees. In other words, as a joint rotates at an articulation angle, meaning grease is filled when the open space becomes wider and grease is squeezed out and pumped into chasm between the parts when the open space becomes narrower. Therefore friction is reduced between the cage and the inner joint part thus providing better performance of the joint, and provides sufficient lubrication between a ball and a ball track. This feature also increases durability of the joint and reduces the size of the joint.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 2A:
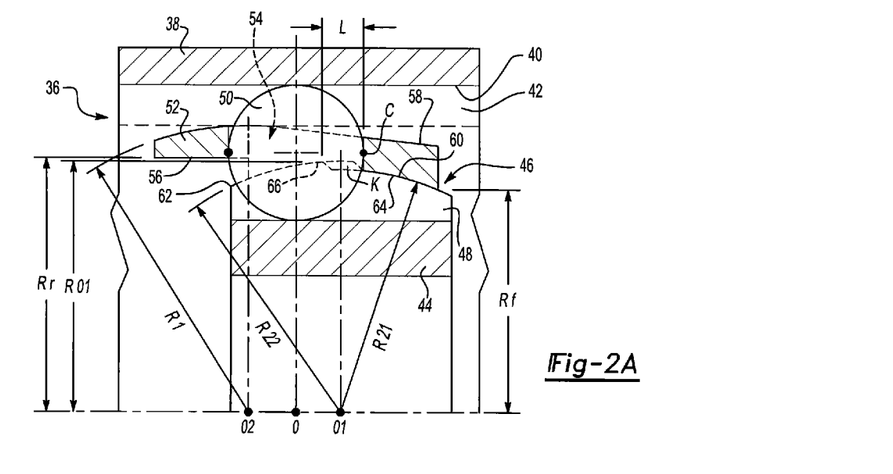
FIG. 2A is an enlarged side sectional view of a portion of a joint depicting a first embodiment.

Now an embodiment that differs from the above-described prior art will be described below with reference to the accompanying drawings. FIG. 2A shows a double offset constant velocity joint 36 according to a first embodiment. The constant velocity joint 36 comprises an outer joint part 38 having a cylindrical inner surface 40 formed with a plurality of circumferentially spaced linear guide tracks 42. An inner joint part 44 is also provided having an outer surface 46 formed with linear guide tracks 48 complimentary to those in the outer joint part 38. A plurality of torque-transmitting balls 50 are disposed within the ball tracks 42, 48. A cage 52 retains the balls 50 in a plurality of circumferentially spaced pockets 54. The cage 52 also comprises an inner concave spherical surface 56 and an outer convex spherical surface 58 offset to the opposite sides O1, O2 in the axial direction from the center of ball pocket O. The outer convex spherical surface 58 contacts the cylindrical inner surface 40 of the outer joint part 38, via the tracks 42, while the inner concave spherical surface 56 contacts the outer convex spherical surface 58 of inner joint part 44.

The center of the inner joint part 44 is offset to a side O1 facing its front opening Rf and a ball 50 mainly reciprocates more on the portion of the tracks 42, 48 facing the rear opening Rf of cage 52 than on the portion of the tracks 42, 48 facing the front opening of cage 52 by the offset amount. The center of the cage 52 may also be offset to a side (not shown).

With respect to the center line O1 of the outer convex spherical surface 46 of inner joint part 44, two partial spherical surfaces 60, 62 with their different radii R21, R22 are formed on the outer surface 46 of the inner joint part 14 with respect to the center O1 offset from the center of the ball 50, respectively. An inner partial spherical surface 64 having the center O1 is formed on the inner surface 56 of the cage 52 facing the front opening Rf of the cage 16 from a position L offset to the front opening of the cage 16.

Another partial spherical surface 66 with a larger spherical radius having the same center O1 is formed on the inner surface 56 of the cage 16 facing the rear opening Rr of the cage 16. An open space K is provided between the two different spherical surfaces 60, 62, 64, 66 with their different radii R21, R22 to allow the inner joint part 14 to rotate relatively to the cage 16 along the spherical surfaces 60, 62, 64, 66. The size of open space K is determined by a relative circumferential movement of the inner joint part 14 to point O2, which is equivalent to half an articulation angle.

Figure 2B:
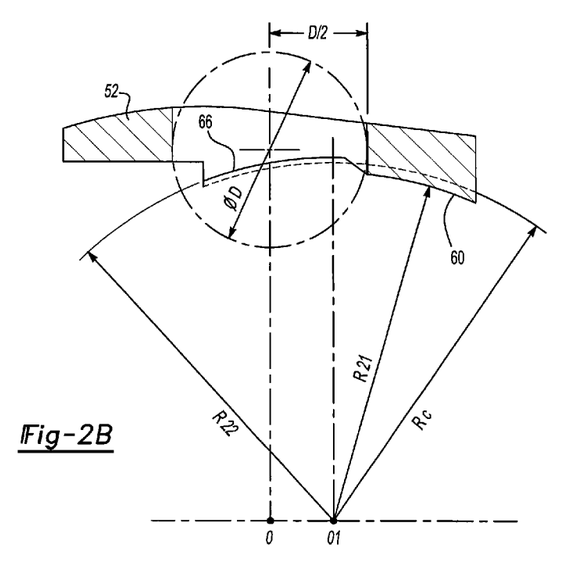
FIG. 2B is a view showing the differences between a conventional cage and the embodiment in FIG. 2A.

FIG. 2B shows a difference in cage 52 between a conventional cage and the present case, in which RC represents an inner sphere radius of a conventional cage, as shown in the dotted line. The two radii R21, R22, of the partial spherical surfaces of the inner joint parts 60, 62 are depicted. The location of surface 62 is formed from a position equivalent to half of a ball diameter D/2 toward the front beginning opening of the cage Rf.

Figure 2C:
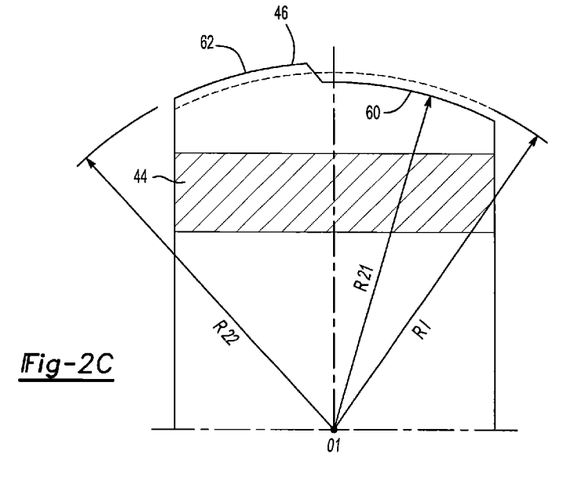
FIG. 2C is a view showing the differences between a conventional inner joint part and the embodiment in FIG. 2A.

FIG. 2C shows a difference in the inner joint part 44 between a conventional inner joint part and the present inner joint part in which RI represents the outer sphere radius of a conventional inner joint part, as shown in dotted line. As an advantage of the present joint, the partial spherical surface 62 with the larger spherical radius R22 formed on the outer surface 46 of the inner joint part 44 toward the rear opening Rr of the cage 52 is larger than a spherical radius of the conventional art RI. This provides more margin of contact ellipse length (=R22−RI) on a ball track, thus increasing joint durability and decreasing the size of the joint 36 by the increment in the radius of the spherical surface (=R22−RI). The partial spherical surface 60, with the smaller spherical radius R21 formed on the inner joint part 44 toward the front opening of the cage 52, has a smaller spherical radius than that of the conventional art RI. This provides more margin of contact length (=R22−Rc=SS1) on the surface of the ball pocket, thus increasing joint durability and decreasing the size of the joint 36 by the difference in the radius of the spherical surface of cage (=R22−Rc).

Figure 3A:
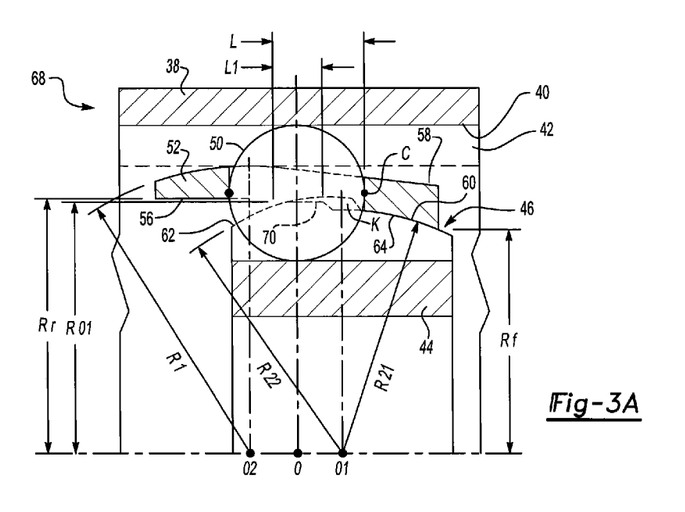
FIG. 3A is a view showing a second embodiment of the joint.

FIG. 3A shows a double offset constant velocity joint 68 according to another embodiment. The same reference numbers from FIGS. 2A, 2B and 2C are used for the same features in FIGS. 3A, 3B and 3C. One difference between the embodiment depicted in FIG. 2A and the embodiment depicted in FIG. 3A is that a flat cylindrical surface 70 defined by L1 and RO1 is formed additionally on the partial spherical surface 60 of the inner joint part 44' to assemble the inner joint part 44' into the cage 52 through the rear opening diameter Rr of cage 52. The partial spherical surface 62 should be cut off at the central portion O of the inner joint part 44' and also R22 should not be greater than the rear opening diameter RO1.

Figure 3B:
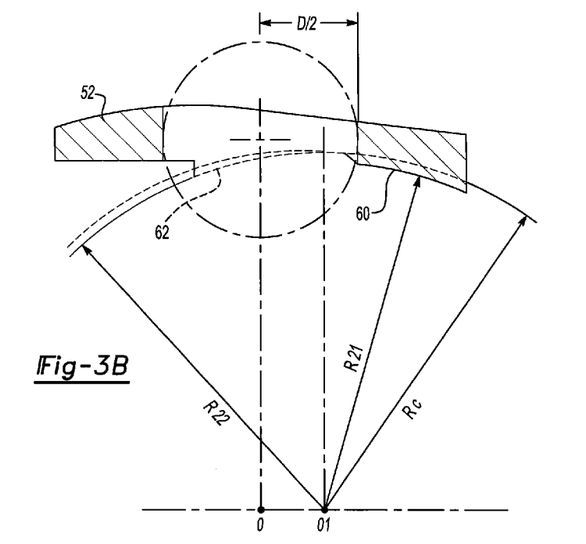
FIG. 3B is a view showing the differences between a conventional cage and the embodiment in FIG. 3A.
Figure 3C:
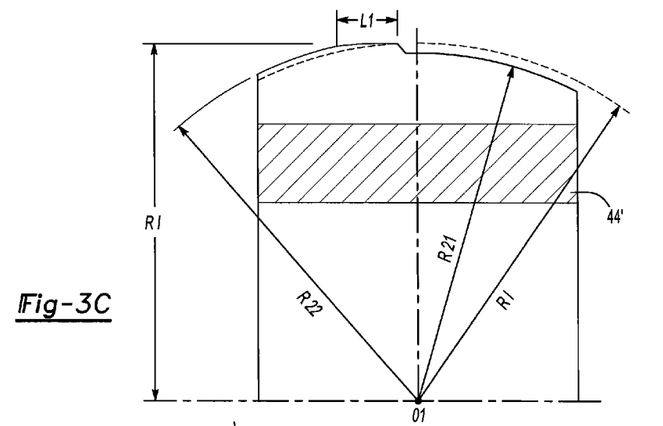
FIG. 3C is a view showing the differences between a conventional inner joint part and the embodiment of FIG. 3A.

FIG. 3B and FIG. 3C show detailed drawings with regards to FIG. 3A. FIG. 3B shows a difference in cage 52 between a conventional cage and the present case. As in FIG. 2B, Rc in FIG. 3B represents an inner sphere radius of a conventional cage. The two radii R22, R21 of the partial spherical surfaces 60, 62 of the inner joint part 44' are depicted. The location of surface 64 is formed from a position equivalent to half a ball diameter D/2 toward the front opening of cage Rf.

FIG. 3C shows a difference in the inner joint part 44' between a conventional inner joint part and the present inner joint part where RI represents the outer sphere radius of a conventional inner joint part, as shown in dotted line. The advantages of joint 36 are thus achieved in the joint design for joint 68.

Figure 4A:
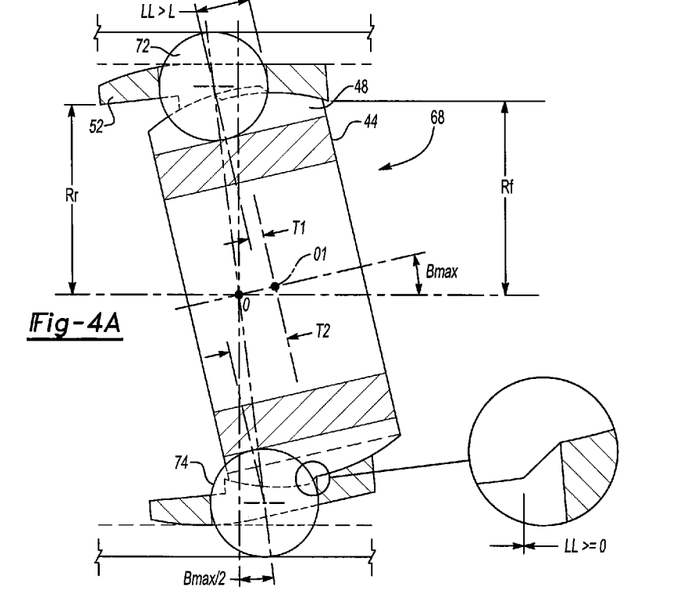
FIG. 4A is a view showing the operation of a joint of the present application.

FIG. 4A is a view showing the operation of the joint 36 at a maximum articulation angle of B max, in which a first ball 72 having a phase angle of zero degrees travels toward a front opening diameter Rf of the cage 52 on the ball track 48 of the inner joint part 44 by T1, while a second ball 74 having a phase angle of 180 degrees travels toward the rear opening diameter Rr of the cage 52 on the ball track 48 of the inner joint part 44 by T2. While joint 36 is depicted in FIG. 4A, it can be readily appreciated that the operation depicted in FIGS. 4A-4D, can be readily applied to joint 68 of FIGS. 3A-3C.

Figure 4B:
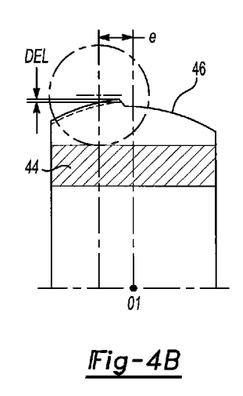
FIG. 4B is a view showing the differences between a conventional inner joint part and an embodiment of the joint at zero articulation angle.

FIG. 4B is a view showing the difference in contact ellipse length margin on the outer spherical surface 46 of the inner joint part 44 between a conventional inner joint part and the inner joint part 44 of the present joint 36 at zero articulation angle. The conventional inner joint part outer spherical surface is depicted in dashed lines.

Figure 4C:
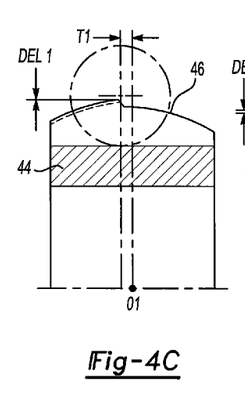
FIG. 4C is a view showing the differences between a conventional inner joint part and the present joint at the maximum articulation angle and at zero phase angle.

FIG. 4C is a view showing the difference in contact ellipse length margin on the outer spherical surface 46 of the inner joint part 44 between a conventional inner joint part and the inner joint part 44 of the present joint 36 at a maximum articulation angle and at a zero phase angle. Again, the conventional inner joint part outer spherical surface is depicted in dashed lines.

Figure 4D:
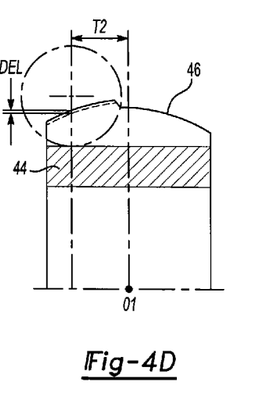
FIG. 4D is a view showing the differences between a conventional inner joint part and the present joint at a maximum articulation angle and at 180 degrees of phase angle.

FIG. 4D is a view showing the difference in contact ellipse length margin on the outer spherical surface 46 of the inner joint part 44 between a conventional inner joint part and the present joint 36 at a maximum articulation angle and at a phase angle of 180 degrees. The conventional inner joint part outer spherical surface is depicted in dashed lines.

As shown in FIG. 4B to FIG. 4D, joint 36 has more margin of contact ellipse length than the conventional art by DEL at e meaning zero articulation angle. It also has more margin of contact ellipse length than the conventional art by DEL meaning T2 and maximum articulation and a phase angle of 180 degrees than the conventional art. However, it does not have any more contact ellipse length margin than the conventional art at T1 meaning maximum articulation and a phase angle of zero degrees, which means the present joint is equivalent to the conventional art at maximum articulation angle and at T1. However, since the margin of contact ellipse length at T1 still becomes greater than that at T2, it is not necessary to secure more contact ellipse length margin on the central portion of the outer spherical surface 46 of the inner joint part 44 in terms of a margin in balance. Consequently, present joint 36 has increased durability, while achieving a reduction of weight and size. On the other hand, the present joint 36 is designed in a fashion that the open space L, at zero articulation angle gets wider to LL at a phase angle of zero degrees and gets narrower to zero (LL=0) at a phase angle of 180 degrees, as shown in FIG. 4A. Therefore, the mechanism of the present joint 36 provides a better lubrication system, meaning that grease is filled, when the open space becomes wider, while grease is squeezed out and pumped into the chasm between the parts when the open space becomes narrower. Therefore, it can reduce friction between the cage 52 and the inner joint part 44, eventually providing better NVH performance of the joint 68. Additionally, it also can supply a sufficient amount of lubrication between a ball 72 or 74, and a ball track 48, thus increasing the durability of the joint 36 and allowing the joint 36 to be made more compact in size.

Figure 5A:
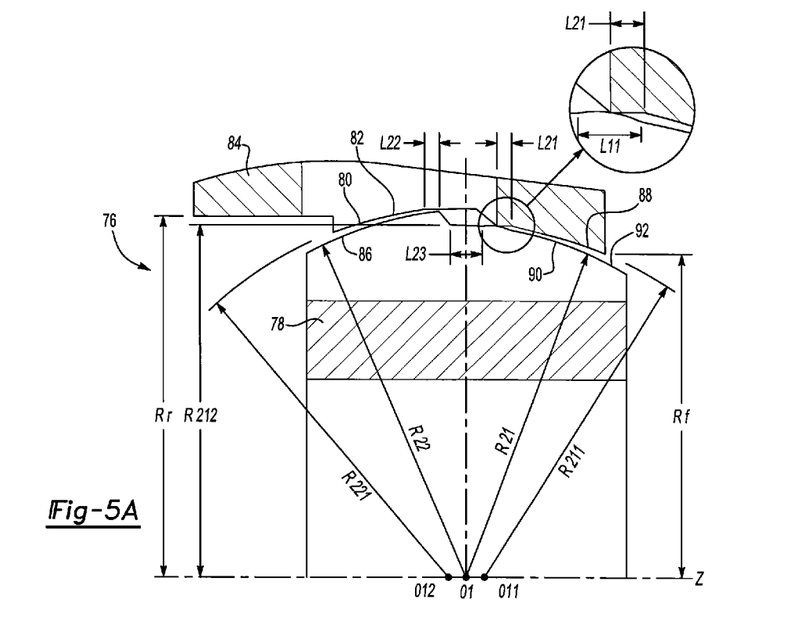
FIG. 5A is a view showing a third embodiment of the joint.
Figure 5B:
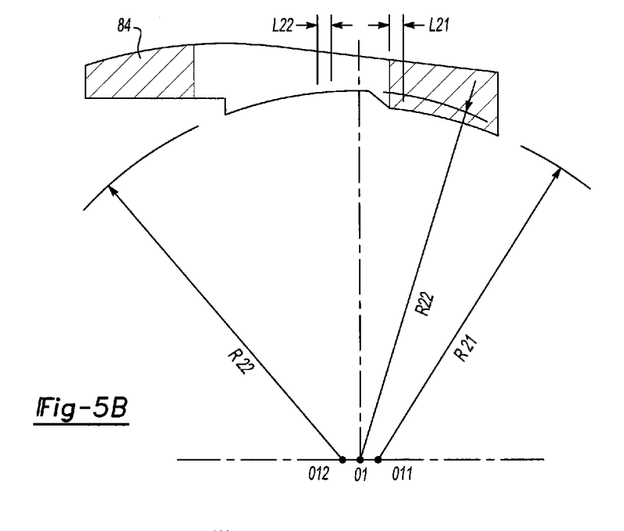
FIG. 5B is a view showing the cage of the embodiment in FIG. 5A.

FIGS. 5A and 5B show a double offset constant velocity joint 76 according to a preferred third embodiment that is intended to allow an inner joint part 78 to move in the axial direction Z for the purpose of improving NVH characteristics related to engine idling. To achieve this objective, a first partial spherical surface 80 with a radius R221 having a center O12 offset from the center of cage inner surface O1 is formed on an inner surface 82 of a cage 84 facing the rear opening Rr of the cage 84. A first flat cylindrical surface L22 with inner diameter R221 is smoothly formed to be directly adjacent to the first partial spherical surface 80. A second partial spherical surface 86 defined by R22 is adjacent to the first flat cylindrical surface L22 and is extended approximately to a position offset from the center of the cage inner surface. The second partial spherical surface 86 has a center O1 and faces the rear opening Rr of the cage 84. R22 is less than R221.

A third partial spherical surface 88 with a radius R211 having a center O11 offset from the center of the cage inner surface O1 is formed on the inner surface of the cage 84 facing a front opening Rf of the cage 96. R211 is smaller than R221. A second flat cylindrical surface L21 with an inner diameter equal to the third partial spherical surface 88 is smoothly formed to be adjacent to the third partial spherical surface 88 and extends to cage front opening Rf.

A fourth partial spherical surface 90 with radius R21 having a center O1 is formed on the outer surface 92 of the inner joint part 78 facing the front opening Rf of the cage 84, in which a convex spherical surface defined by L11 and R211 is additionally formed and a flat cylindrical surface defined by R212 and L23, smaller than the convex spherical surface in diameter, is additionally formed to get the convex spherical surface to contact the flat surface L21. R21 is smaller than R22.

Figure 6:
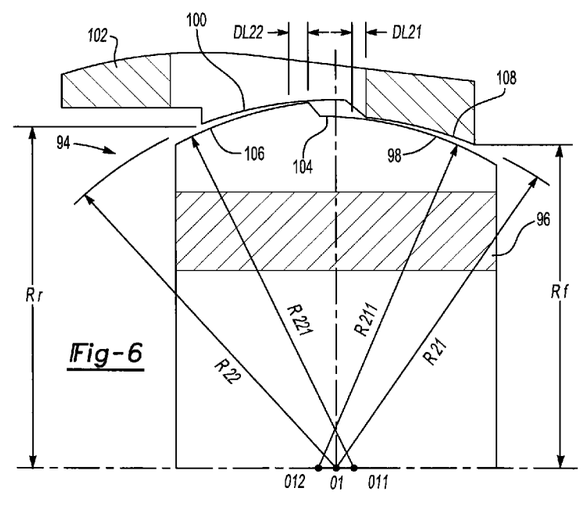
FIG. 6 is a view showing a fourth embodiment of the joint of the present application.

FIG. 6 shows a double offset constant velocity joint 94 according to the preferred fourth embodiment that is intended to allow an inner joint part 96 to move in the axial direction Z for the purpose of improving NVH characteristics related to engine idling. To achieve this objective, a first partial spherical surface 98 with radius R211 having a center O12 offset from a center O1 of the inner surface 100 of a cage 102 is formed on an outer surface of the inner joint part 96 facing a front opening Rf of the cage 102. A second partial spherical surface 106 with radius R221 having a center O11 offset from the center O1 of the cage inner surface 100 is formed on the outer surface 104 of the inner joint part 96 facing the rear opening Rf of the cage 102. A third partial spherical surface 108 with radius R21 having a center O1 is formed on the inner surface 100 of the cage 102 facing the front opening Rf of the cage 102. A fourth partial spherical surface 102 with radius R22 having a center O1 is formed on the inner surface 100 of the cage 102 facing the rear opening Rr of cage 102. Therefore, the inner joint part 96 is allowed to move in the axial direction Z by DL21 and DL22

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A constant velocity joint, comprising:
an outer joint part;
a ball cage containing one ball in each of a plurality of circumferentially spaced windows in said cage, said ball cage having a first inner partial spherical surface facing a front opening of said cage defined by a first radius having a center offset from a ball center, a second inner partial spherical surface facing a rear opening of the cage defined by a second radius extending from the same center offset from said ball center, wherein said first radius is smaller than said second radius, and a single transition section between said partial spherical surfaces of said ball cage;
an inner joint part having a first partial spherical surface facing a front opening of said cage, a second partial spherical surface facing a rear opening of said cage and a single transition section between said partial spherical surfaces of said inner joint part;
wherein said ball cage spherical surfaces and said inner race spherical surfaces define between them an open space having a predetermined length defined by the overlap of said first inner partial spherical surface of said ball cage and said first partial spherical surface of said inner joint part.

2. The constant velocity joint of claim 1, wherein said predetermined length is bounded by said transition sections of both said ball cage and said inner joint part.

3. The constant velocity joint of claim 1, wherein an inner concave spherical surface on said ball cage extends without interruption to said second inner partial spherical surface on said ball cage.

4. The constant velocity joint of claim 1, wherein said first inner partial spherical surface on said cage extends forward from a point that coincides with a radius of one of said balls in one of said circumferentially spaced windows.

5. The constant velocity joint of claim 1, wherein said single transition section of said ball cage and said single transition section of said inner joint part are offset from one another.

6. A constant velocity joint, comprising:
an outer joint part;
a ball cage containing one ball in each of a plurality of circumferentially spaced windows in said cage, said ball cage having a first inner partial spherical surface facing a front opening of said cage defined by a first radius having a center offset from a ball center, a second inner partial spherical surface facing a rear opening of the cage defined by a second radius having the same center offset from said ball center, wherein said first radius is smaller than said second radius, and a transition section between said partial spherical surfaces;
an inner joint part having a first partial spherical surface facing a front opening of said cage, a second partial spherical surface facing a rear opening of said cage, a flat cylindrical surface in direct contact with said second partial spherical surface, and a transition section in direct contact with said flat cylindrical section and said first partial spherical surface;
wherein said ball cage spherical surfaces, said inner joint part first partial spherical surface and said flat cylindrical surface define between them an open space having a predetermined length.

7. The constant velocity joint of claim 6, wherein said predetermined length is bounded by said first partial spherical surface and said second partial spherical surface on said inner joint part.

8. The constant velocity joint of claim 6, wherein an inner concave spherical surface on said ball cage extends without interruption to said second inner partial spherical surface on said ball cage.

9. The constant velocity joint of claim 6, wherein said first inner partial spherical surface on said cage extends forward from a point that coincides with a radius of one of said balls in one of said circumferentially spaced windows.

10. The constant velocity joint of claim 6, wherein said transition section of said ball cage and said transition section of said inner joint part are offset from one another.

11. A constant velocity joint, comprising:
an outer joint part;
a ball cage containing one ball in each of a plurality of circumferentially spaced windows in said cage, said ball cage having a first inner partial spherical surface facing a rear opening of said cage defined by a first radius having a center rearwardly offset from a center of a cage inner surface;
an inner joint part having a second partial spherical surface adjacent said first inner partial spherical surface of said ball cage defined by a second radius, said second radius is less than said first radius;

a third partial spherical surface on said ball cage facing a front opening of said cage defined by a third radius having a center forwardly offset from said center of said cage inner surface;

a fourth partial spherical surface on said inner joint part adjacent said third partial spherical surface of said ball cage defined by a fourth radius, said fourth radius less than said first radius, said fourth radius and said second radius having the same center;

a first flat cylindrical surface formed directly adjacent said ball cage first inner partial spherical surface;

a second flat cylindrical surface formed directly adjacent said ball cage third partial spherical surface; and a second angled transition between said second partial spherical surface and said fourth partial spherical surface on said inner joint part.

12. The constant velocity joint of claim 11, further comprising a first angled transition between said first flat cylindrical surface and said second flat cylindrical surface on said ball cage.

13. The constant velocity joint of claim 12, wherein said first angled transition and said second angled transition are offset from one another.

14. The constant velocity joint of claim 13, further comprising a convex spherical surface on said ball cage between said first angled transition and said third spherical surface.

15. The constant velocity joint of claim 14, further comprising a flat cylindrical surface on said inner joint part between said fourth partial spherical surface and said second angled transition.

16. A constant velocity joint, comprising:

an outer joint part;

an inner joint part having a first partial spherical surface facing a front opening of said inner joint part, said first partial spherical surface defined by a first radius having a center rearwardly offset from a center of an inner surface of a cage, said inner joint part also having a second partial spherical surface facing a rear opening of said inner joint part, said second partial spherical surface defined by a second radius having a center forwardly offset from said center of said inner surface of said cage;

a third partial spherical surface on said cage, said third partial spherical surface facing a front opening of said cage and defined by third radius at having a center at said center of said inner surface of said cage, a fourth partial spherical surface on said cage facing a rear opening of said cage and defined by a fourth radius sharing a center with said third radius, wherein said fourth and said third radii are greater than said second and first radii and wherein said second radius is greater than said first radius and said fourth radius is greater than said third radius.

* * * * *